US012590040B2

(12) United States Patent (10) Patent No.: US 12,590,040 B2
Brennan et al. (45) Date of Patent: Mar. 31, 2026

(54) BONDCOATS HAVING A METALLOID-BASED MATERIAL MATRIX

(71) Applicant: General Electric Company, Schenectady, NY (US)

(72) Inventors: Marissa Chantal Brennan, Schenectady, NY (US); Andrea Lena Vozar, Niskayuna, NY (US); James Anthony Ruud, Delmar, NY (US); Enes Sales, Albany, NY (US)

(73) Assignee: General Electric Company, Evendale, OH (US)

( * ) Notice: Subject to any disclaimer, the term of this patent is extended or adjusted under 35 U.S.C. 154(b) by 568 days.

(21) Appl. No.: 18/102,815

(22) Filed: Jan. 30, 2023

(65) Prior Publication Data

US 2024/0254060 A1 Aug. 1, 2024

(51) Int. Cl.
| | |
|---|---|
| *C04B 41/87* | (2006.01) |
| *C04B 35/14* | (2006.01) |
| *C04B 35/565* | (2006.01) |
| *C04B 35/628* | (2006.01) |
| *C04B 35/63* | (2006.01) |

(52) U.S. Cl.
CPC .............. *C04B 41/87* (2013.01); *C04B 35/14* (2013.01); *C04B 35/565* (2013.01); *C04B 35/62807* (2013.01); *C04B 35/62828* (2013.01); *C04B 35/6303* (2013.01); *C04B 2235/3418* (2013.01); *C04B 2235/3826* (2013.01); *C04B 2235/428* (2013.01); *C04B 2235/528* (2013.01); *C04B 2235/5436* (2013.01)

(58) Field of Classification Search
None
See application file for complete search history.

(56) References Cited

U.S. PATENT DOCUMENTS

| | | | |
|---|---|---|---|
| 6,410,148 | B1 | 6/2002 | Eaton, Jr. et al. |
| 6,887,448 | B2 | 5/2005 | Block et al. |
| 7,300,702 | B2 | 11/2007 | Li et al. |
| 7,354,651 | B2 | 4/2008 | Hazel et al. |
| 8,007,246 | B2 | 8/2011 | Rowe et al. |
| 8,511,993 | B2 | 8/2013 | Kemppainen et al. |

(Continued)

FOREIGN PATENT DOCUMENTS

| | | |
|---|---|---|
| JP | 2018048046 A | 3/2018 |

OTHER PUBLICATIONS

Kusano et al., Effects of Impurity Iron Content on Characteristics of Sintered Reaction-Bonded Silicon Nitride, International Journal of Applied Ceramic Technology, 2012. Abstract Only https://doi.org/10.1111/j.1744-7402.2012.02767.x.

(Continued)

*Primary Examiner* — Jeffrey D Washville
(74) *Attorney, Agent, or Firm* — Dority & Manning, P.A.

(57) ABSTRACT

Coated components are provided that include a substrate having a surface; a bondcoat over the surface of the substrate; a thermally grown oxide layer over the bondcoat; and an environmental barrier coating over the thermally grown oxide layer. The bondcoat includes a plurality of core-shell particulates and a plurality of oxide-sintering aid globular phases dispersed within a metalloid-based material matrix. The plurality of core-shell particulates have a shell comprising a metalloid oxide around a core comprising a metalloid-based material. The plurality of oxide-sintering aid globular phases includes a mixture of the metalloid oxide and a sintering aid.

20 Claims, 2 Drawing Sheets

(56) References Cited

U.S. PATENT DOCUMENTS

| | | | |
|---|---|---|---|
| 10,414,694 | B2 | 9/2019 | Strock et al. |
| 10,822,998 | B2 | 11/2020 | Luthra et al. |
| 2015/0030871 | A1 | 1/2015 | Bruck et al. |
| 2017/0122561 | A1 | 5/2017 | Nagaraj |
| 2020/0024977 | A1 | 1/2020 | Shi et al. |
| 2021/0054749 | A1 | 2/2021 | Jackson et al. |

OTHER PUBLICATIONS

Zhu et al., Processing and Thermal Conductivity of Sintered Reaction-Bonded Silicon Nitride. I: Effect of SI Powder Characteristics, Journal of the American Ceramic Society, 2016. (Abstract Only) https://ceramics.onlinelibrary.wiley.com/doi/abs/10.1111/j.1551-2916.2006.01195.x.

BONDCOATS HAVING A METALLOID-BASED MATERIAL MATRIX

FIELD OF TECHNOLOGY

The present disclosure relates generally to metalloid-based bond coats for environmental barrier coatings (EBCs), along with components coated with the same.

BACKGROUND

Silicon-based materials are employed for high temperature components of gas turbine engines such as, for instance, airfoils (e.g., blades, vanes), combustor liners, and shrouds. The silicon-based materials may include silicon-based monolithic ceramic materials, intermetallic materials, and composites. For example, silicon-based ceramic matrix composites (CMCs) may include silicon-containing fibers reinforcing a silicon-containing matrix phase.

BRIEF DESCRIPTION OF THE DRAWINGS

A full and enabling disclosure of the present disclosure, including the best mode thereof, directed to one of ordinary skill in the art, is set forth in the specification, which makes reference to the appended FIGS., in which.

Figure 1:
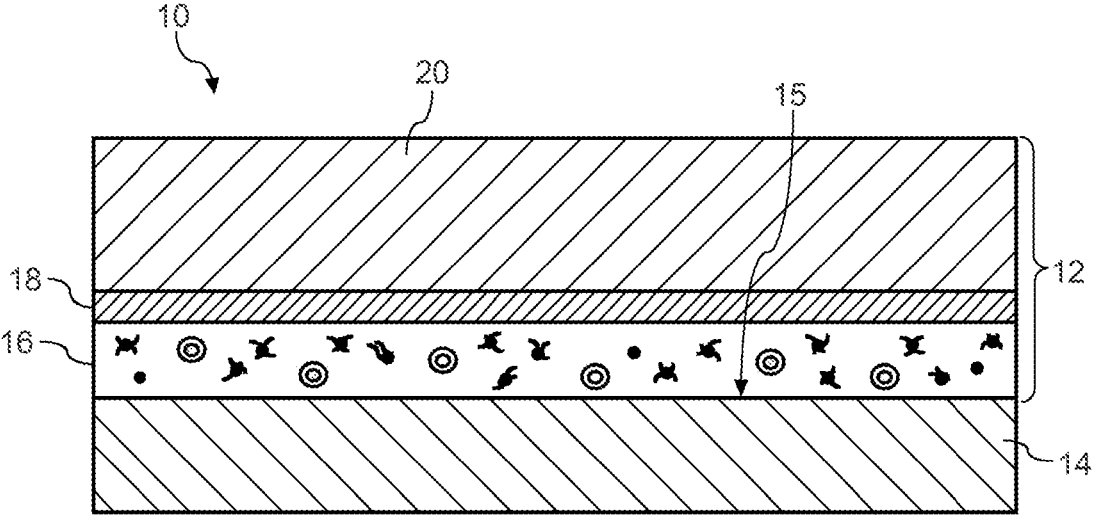
FIG. 1 is a cross-sectional representation of a coated component according to an exemplary embodiment of the present disclosure.

Repeat use of reference characters in the present specification and drawings is intended to represent the same or analogous features or elements of the present disclosure.

Definitions

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, "Ln" refers to a rare earth element or a mixture of rare earth elements. More specifically, the "Ln"

refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "defect" as used herein refers to a portion of the protective layers and/or substrate exposed to the environment due to damage.

The term "slurry" as used herein refers to a mixture of at least one solid constituent with at least one liquid constituent.

The term "sintering aid" as used herein refers to a material that decreases the sintering temperature of the consolidated powder particles and/or enhances sintering kinetics of the dried patch material at a particular sintering temperature.

The term "viscosity modifier" refers to a material that alters rheology of the slurry as a function of applied stress and/or shear rate during deposition of the slurry.

As used herein, the term "silicon-containing substrate" is a substrate that includes silicon, a silicon alloy, a compound having silicon and at least one other element, or a combination of silicon alloy and the compound having silicon and the at least one other element. As used herein in the context of silicon-containing powders, the terms "silicon" and "silicon-based alloy" refer to their respective unoxidized forms.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

As used herein, an environmental-barrier-coating ("EBC") refers to a coating system comprising one or more layers of ceramic materials, each of which provides specific or multi-functional protections to the underlying CMC. EBCs generally include a plurality of layers, such as rare earth silicate coatings (e.g., rare earth disilicates such as slurry or APS-deposited yttrium ytterbium disilicate (YbYDS)), alkaline earth aluminosilicates (e.g., comprising barium-strontium-aluminum silicate (BSAS), such as having a range of BaO, SrO, $Al_2O_3$, and/or $SiO_2$ compositions), hermetic layers (e.g., a rare earth disilicate), and/or outer coatings (e.g., comprising a rare earth monosilicate, such as slurry or APS-deposited yttrium monosilicate (YMS)). One or more layers may be doped as desired, and the EBC may also be coated with an abradable coating.

As used herein, the term "substantially free" is understood to mean completely free of said constituent, or inclusive of trace amounts of same. "Trace amounts" are those quantitative levels of chemical constituent that are barely detectable and provide no benefit to the functional or aesthetic properties of the subject composition. The term "substantially free" also encompasses completely free.

DETAILED DESCRIPTION OF PARTICULAR EMBODIMENTS

Reference now will be made in detail to embodiments of the present disclosure, one or more examples of which are illustrated in the drawings. Each example is provided by way of explanation of the present disclosure, not limitation thereof. In fact, it will be apparent to those skilled in the art that various modifications and variations can be made in the present disclosure without departing from its scope. For instance, features illustrated or described as part of one embodiment can be used with another embodiment to yield a still further embodiment. Thus, it is intended that the present disclosure covers such modifications and variations as come within the scope of the appended claims and their equivalents.

Although silicon-containing substrates exhibit desirable high temperature characteristics, such substrates can suffer from rapid recession in combustion environments. For example, silicon-containing substrates are susceptible to volatilization upon high-temperature exposure to reactive species such as water vapor. In such cases, coatings are used to protect the silicon-containing substrates. Silicon-containing substrates, such as CMCs, may have multiple protective coating layers on its surface, such as a silicon bondcoat and di-silicate and/or mono-silicate EBCs. These protective layers help to prevent the degradation of silicon-containing substrates in a corrosive water-containing environment by inhibiting the ingress of water vapor and the subsequent formation of volatile products such as silicon hydroxide (e.g., $Si(OH)_4$). Several additional layers, such as an abradable layer, may also be deposited on the EBC to provide specific functionality to CMC components. Thus, the protective layers may enhance the high temperature environmental stability of silicon-containing substrates. Other desired properties for the EBC include a thermal expansion compatibility with the silicon-containing substrate, low permeability for oxidants, low thermal conductivity, and chemical compatibility with the thermally grown silicon-based oxide.

Coated components having improved bondcoats are generally provided, along with methods of their formation. The improved bondcoat may be an adherent, hermetic, relatively defect-free microstructure of a metalloid-based material matrix formed via a thermal spray processing. Generally, the bondcoat is disposed between a silicon-based substrate and the EBC to promote good adhesion and to act as a barrier to substrate oxidation. By employing bondcoat compositions that do not form gaseous oxidation products (e.g., $CO_2$, CO, $N_2$), the bondcoat may also help extend the operating life of the silicon-based substrate/EBC system. Some of the desired properties of the bondcoat include absence of interconnected porosity, low intrinsic oxygen permeability and thermal expansion coefficient compatibility with the substrate.

FIG. 1 is a cross-sectional view of a component 10 for use in a high temperature environment of a gas turbine engine, such as a blade, a vane, a combustor liner, a shroud, etc. The component 10 includes a multilayered coating 12 on a surface 15 of a silicon-containing substrate 14. In the embodiment shown, a bondcoat 16 is present on the surface 15 of the silicon-containing substrate 14, and a thermally grown oxide layer 18 (TGO layer 18) is present over the bondcoat 16. For example, the thermally grown oxide layer 18 may include silica, particularly when the bondcoat 16 comprises silicon. An EBC 20 is present over the thermally grown oxide layer 18.

The silicon-containing substrate 14 may be selected for its high temperature mechanical, physical, and/or chemical properties. The silicon-containing substrate 14 may include any silicon-containing material, such as a silicon-based ceramic material. In a particular embodiment, the silicon-containing substrate 14 includes a silicon-based CMC, such as a silicon carbide containing matrix reinforced with fibers (e.g., silicon carbide). In another example, the silicon-containing substrate 14 may be a silicon-based monolithic ceramic material, for instance silicon carbide (SiC), silicon nitride ($Si_3N_4$) or a combination of SiC and $Si_3N_4$. In embodiments, the silicon-containing substrate 14 may be fabricated from a material that can withstand combustion environments at operating temperatures greater than 1150° C. for a duration exceeding 20,000 hours.

The bondcoat 16 generally serves as a chemical barrier, preventing oxidation of the silicon-containing substrate 14 by forming a protective thermally grown oxide layer 18 thereon. Additionally, the bondcoat 16 may generally promote the adhesion between the substrate 14 and the EBC 20 by helping to bridge any mismatch between the CTE of the relative materials. The bondcoat 16 may have a thickness in a range of 25 micrometers (microns, μm) to 150 μm. In embodiments, the thermally grown oxide layer 18 may have an initial (as-formed) thickness in a range from 1 μm to 10 μm. The thickness of the thermally grown oxide layer 18 may further increase due to the oxidation of the underlying bondcoat 16 during use.

Figure 2:
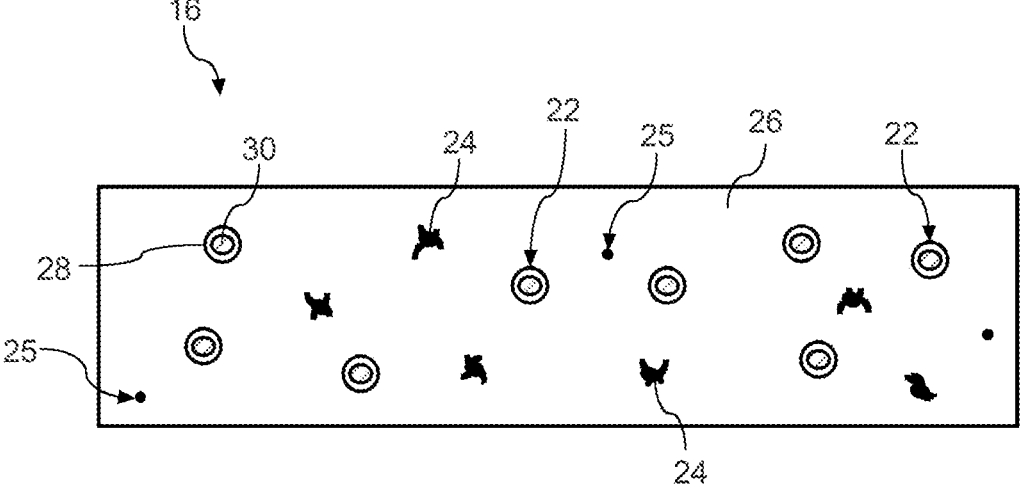
FIG. 2 is a cross-sectional representation of a bondcoat of the coated component of FIG. 1 applied according to an exemplary embodiment of the present disclosure.

The bondcoat 16 is formed via a high velocity air-fuel (HVAF) thermally sprayed coating process that results in a dense microstructure that includes discrete particulates dispersed therein. Referring to FIG. 2, the bondcoat 16 is shown in an expanded view as including a plurality of core-shell particulates 22 and a plurality of oxide-sintering aid globular phases 24 dispersed within a metalloid-based material matrix 26 (i.e., not continuous therein), such as a silicon-based matrix. It is noted that the represented depiction shown in FIGS. 1 and 2 of the bondcoat 16 is for understanding purposes only and is not intended to be to scale.

The metalloid-based material matrix 26 may, in particular embodiments, include silicon in an amount of at least 50% by weight (i.e., a silicon-based material matrix 26). In embodiments, such a silicon-based matrix includes elemental silicon (i.e., pure silicon), a silicon alloy having at least 90% by weight silicon, a metal silicide, or a combination thereof. Generally, the silicon-based matrix forms a continuous phase spanning the entire thickness of the bondcoat 16, with discrete phases formed therein by the plurality of core-shell particulates 22 and the plurality of oxide-sintering aid globular phases 24.

The plurality of core-shell particulates 22 have a shell 28 around a core 30, with the shell 28 being continuous or discontinuous thereon. Through the HVAF process, the plurality of core-shell particulates 22 may be formed to an average sphericity of 1.0 to 1.8. Additionally, the plurality of core-shell particulates 22 may be relatively small, such as an average diameter that is 3 μm or less (e.g., 1 μm or less). In most embodiments, the shell 28 covers greater than 80% of the surface area of the core 30, such as greater than 90% of the surface area of the core 30. In particular embodiments, the shell 28 covers substantially all of the surface area of the core 30.

In embodiments, the shell 28 includes a metalloid oxide, and the core 30 includes a metalloid-based material (including the same metalloid of the shell). The metalloid-based material may be substantially free from a metalloid oxide. For example, the metalloid oxide of the shell 28 may be silicon oxide and the core 30 may be a silicon-based material (e.g., pure silicon, a silicide, or another non-oxide silicon material). Generally, the bondcoat 16 may include the plurality of core-shell particulates 22 and the plurality of oxide-sintering aid globular phases in an amount such that the bondcoat 16 has a degree of oxidation that is 5% by volume to 40% by volume.

In embodiments, the plurality of oxide-sintering aid globular phases 24 includes a mixture of the metalloid oxide and a sintering aid. Particularly suitable sintering aids include Al, B, Ca, Cu, Fe, Hf, Mg, Mn, N, Ni, P, O, Ti, V, Zr, Au, Cr, Sn, In, Bi, Ga, La, Ce, Sb, As, Hf, a mullite-based material, and a combination thereof. In embodiments, at least two sintering aids are present in the oxide-sintering aid globular phases 24. For example, the at least two sintering aids may include a combination of Fe and Al, a combination of Fe and Ni, a combination of Fe and Ca, or a combination of Fe, Al, Ca, Ni, Zr, and Cu. The total amount of the sintering aid present may be 0.03% by weight to 1.0% by weight of the bondcoat 16. Without wishing to be bound by any particular theory, it is believed that each sintering aids present in an impurity amount (e.g., 0.001 wt % to 1.0 wt % each) in a metalloid powder (e.g., silicon powder) enables the deposition of the powder to form a metalloid coating by the HVAF process. Metalloid-based powder materials with insufficient sintering aids do not form deposits, while powder materials even with relatively small amounts of sintering aids deposit readily. When at least two sintering aids are present in the oxide-sintering aid globular phases, each sintering aid may be present, independently, in an amount of 0.001% by weight to less than 0.999% by weight.

As stated, the bondcoat 16 may be formed to be a dense layer that does not include a significant amount of defects. For example, defects, such as pores, may define 15% by volume or less of the bondcoat 16, such as 10% by volume or less (e.g., 5% by volume or less, such as 1% by volume or less). Furthermore, any defects that may be present in the bondcoat 16 may be sufficiently small (e.g., may have an average diameter that is less than 1 μm) As such, any defects may not span the thickness of the bondcoat 16.

The impurity amount (e.g., 0.001 wt % to 1.0 wt % each) of sintering aids in the metalloid powder is particularly suitable for deposition via a HVAF processes.

In the HVAF process a fuel/air mixture is input into and ignited in the combustion chamber of a HVAF spray gun, and the heated combustion gases exit through an outlet nozzle which accelerates the gases to high velocity. Input material in the form of powder particles suspended in a liquid is injected into the stream of combustion gases which accelerates and heats the powder particles directing them onto a substrate to form a coating deposit. The fuel gas could be natural gas, propane or propylene. The air pressure to the HVAF spray gun could range from 70 psi to 100 psi. The fuel pressure could range from 60 psi to 100 psi, and the fuel to air ratio could range from 0.9 to 1.1. The gun to substrate distance could range from 3 inches to 9 inches. The powder feed rate could range from 5 g/min to 50 g/min.

The input material for the HVAF process generally includes a powder of a metalloid-based material that, upon deposition, form the plurality of core-shell particulates 22 and the plurality of oxide-sintering aid globular phases 24 dispersed within the metalloid-based matrix 26.

Referring again to FIG. 1, the EBC 20 may provide a thermal barrier as well as a hermetic seal against the corrosive gases in the hot combustion environment, and thus protect the underlying thermally grown oxide layer 18, bondcoat 16, and silicon-containing substrate 14 from overheating and/or thermochemical attack. By way of example, as described above, the protective coatings present over silicon-containing substrate 14 advantageously facilitate inhibition of oxidation, overheating, and/or volatilization of the silicon-containing substrate material in a hot combustion environment of a gas turbine engine.

The EBC 20 may be a single layer or may include two or more layers. No matter the particular configuration, the EBC 20 may have a total thickness of 25 μm to 1000 μm on the bondcoat 16. In embodiments, the EBC 20 may comprise one or more rare earth (Ln) silicates. In embodiments, the silicate of the Ln element may include, but is not limited to, a rare earth monosilicate ($Ln_2SiO_5$), a rare earth disilicate ($Ln_2Si_2O_7$), or a combination of $Ln_2SiO_5$ and $Ln_2Si_2O_7$. In embodiments, the Ln element in the Ln silicate may include at least one of yttrium, scandium, and elements of the lanthanide series. By way of example, the Ln elements may include yttrium, ytterbium, or lutetium in particular embodiments.

Optionally, one or more additional coatings may be located above or below the EBC 20. Such additional coatings may provide additional functions to the component 10, such as further thermal barrier protection, recession resistance, abradable sealing, thermochemical resistance to corrosion, resistance to erosion, resistance to impact damage, and/or resistance to inter-diffusion between adjacent layers. In embodiments, the EBC 20 and the optional one or more layers may have a coefficient of thermal expansion that is substantially close to a coefficient of thermal expansion of the silicon-containing substrate 14.

An air plasma spray (APS) microstructure for a rare earth disilicate can be porous in the deposited state and not hermetic toward the gaseous species that could cause volatilization of the ceramic matrix composite. Deposition of a glassy layer, such as barium strontium alumino-silicate (BSAS), may be sprayed in the coating system to provide a hermetic layer toward these gaseous species. However, additional layers of rare earth silicate may also be needed and sprayed to separate the glassy layer from the silica source.

The present disclosure provides an EBC applied via a thermal spray process that includes a rare earth silicate-based hermetic layer. The rare earth silicate-based hermetic layer is formed adjacent to the silicon bondcoat, thus eliminating the need for the glassy layers (e.g., BSAS) and the additional silicate-based layers that separate the glassy layer. Also, this disclosure broadly relates to a gas turbine engine component coated with the EBC including a rare earth silicate-based hermetic layer. A method for coating the component with the EBC is also provided.

Without wishing to be bound by any particular theory, it is believed that the sintering aid in the bondcoat 16 may diffuse, during sintering, into an overlying silicate-based EBC layer to form a rare earth silicate-based hermetic portion adjacent to the bondcoat 16. Thus, the resulting coating includes a bondcoat 16 having a rare earth silicate-based hermetic layer formed thereon and a rare earth silicate-based non-hermetic layer formed thereon.

For example, during sintering of the bondcoat 16 and subsequently deposited EBC 20 (e.g., silicate-based EBC layers), the sintering aid may diffuse into the overlying, subsequently applied silicate-based layers to convert rare earth monosilicate to rare earth disilicate. The rare earth disilicate is not inhibited from sintering at a sintering temperatures below the silicon melting point of 1414° C. and thus allows the rare earth disilicate to densify and form a high-density portion that is adjacent to the underlying bondcoat. In one embodiment, this diffusion of the sintering aid allows substantially all of the rare earth monosilicate present to be locally consumed in the portion closest to the bondcoat 16 resulting in a high-density portion forming a hermetic layer at temperatures within an allowable range (e.g., 1260° C. to 1344° C.) that does not degrade the CMC substrate. Thus, sintering transforms the as-deposited silicate-based layer(s) to a rare earth silicate-based hermetic layer (closest to the bondcoat) and a rare earth silicate-based non-hermetic layer on the rare earth silicate-based hermetic layer.

Figure 3:
FIG. 3 is a flowchart of a method of coating a component according to an exemplary embodiment of the present disclosure.
Figure 3:
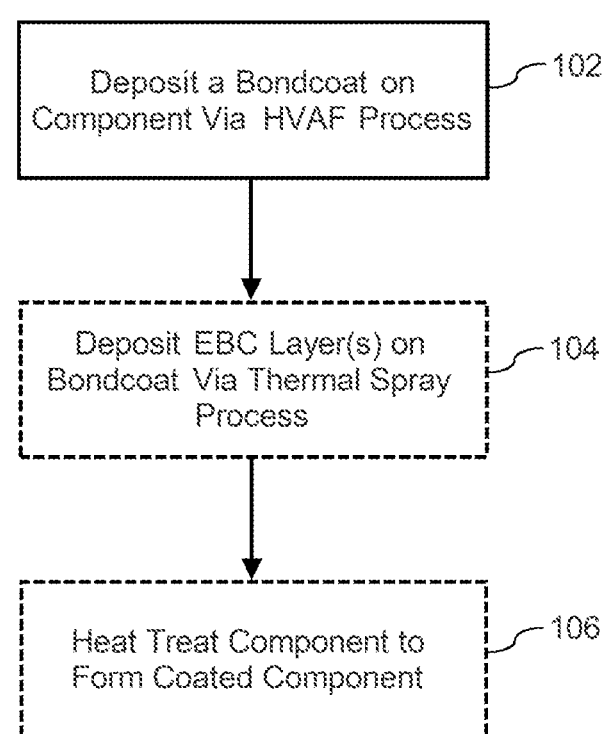

FIG. 3 illustrates a flowchart for a method (100) of coating a component (e.g., a composite component) with a bondcoat and EBC disclosed herein, such as described above with respect to the component 10 with the bondcoat 16 and the EBC 20 shown in FIG. 1. At 102, the method includes depositing a bondcoat layer (e.g., a silicon bondcoat layer) on the surface of the component (e.g., a silicon-based substrate) component. The coating may be applied via a HVAF process to form a distinct microstructure therein, as described above. Optionally, prior to applying the bondcoat layer on the surface of the component, the component can be pretreated mechanically, chemically or both to make the surface more receptive for the EBC. Suitable pretreatment methods include grit blasting, with or without masking of surfaces that are not to be subjected to grit blasting, dry-ice blasting, micromachining, shot peening, laser etching, treatment with chemical etchants such as those containing hydrochloric acid, hydrofluoric acid, nitric acid, ammonium bifluorides and mixtures thereof, treatment with water under pressure (i.e., water jet treatment), with or without loading with abrasive particles, as well as various combinations of these methods.

At 104, the method may include depositing a EBC layer or layers on the bondcoat, such as rare earth silicate-based layer (or layers). The EBC layer(s) can be deposited via any spraying process, including thermal spray processes. In certain embodiments, the rare earth silicate-based layer is deposited via plasma spraying, including APS. For example, a feedstock for a thermal spray process (e.g., APS) including rare earth silicate can be prepared. For example, the feedstock can include a rare earth monosilicate(s) and/or a mixture of a rare earth monosilicate material(s) and a rare earth disilicate material(s). In certain embodiments, the feedstock includes any rare earth silicate including a silicate having a rare earth element selected from the group consisting of ytterbium (Yb), yttrium (Y), scandium (Sc), lutetium (Lu), lanthanum (La), cerium (Ce), praseodymium (Pr), neodymium (Nd), samarium (Sm), dysprosium (Dy), holmium (Ho), erbium (Er), thulium (Tm), europium (Eu), gadolinium (Gd), terbium (Tb), promethium (Pm), and a mixture thereof. In various embodiments, the rare earth silicate is $(Yb_x,Y_{1-x})_2Si_2O_7$ and/or $(Yb_y\text{---}Y_{1-y})_2SiO_5$ where $0 \leq x \leq 1$ and $0 \leq y \leq 1$ as described above. In a particular embodiment, the rare earth silicate is $Yb_2Si_2O_7$.

The rare earth silicate-based layer deposited on the bondcoat could be applied using a range of spray parameters known by someone skilled in the art. As an example, the substrate could be pre-heated prior to deposition in a range of 150° F. to 1200° F. The standoff distance could range from 2 inches to 8 inches. The primary gas could be argon, nitrogen, or helium in a range of from 30 standard cubic feet per hour (SCFH) to 200 SCFH. The secondary gas could be helium, hydrogen, argon, or nitrogen in a range from 60 SCFH to 200 SCFH. The carrier gas could be argon or nitrogen in the range of from 10 SCFH to 20 SCFH. The amperage during spray could range from 500 amps to 1000 amps. The powder feedrate could be in the range of 0.25 lb/hr to 8 lb/hr.

At 106, the method may include heat treating the component such that the rare earth silicate-based layer forms a rare earth silicate-based hermetic layer adjacent to the bondcoat layer and at least one rare earth silicate-based non-hermetic layer thereon. For example, the post-spray heat treatment can include ramp heating the component in increments of 0.1° C. to 10° C. per minute to a sintering temperature ranging from 1200° C. and 1400° C. Once the desired temperature is reached, the component can be held at the desired sintering temperature for between 2 hours and 200 hours. After heat treating, the component can be gradually cooled via ramping the temperature back down in increments of 0.1° C. to 50° C. per minute, such as 10° C. per minute until the component reaches room/ambient temperature.

Heat treating the coated component can be completed in-situ or ex-situ. In embodiments, heat treatment of the component facilitates the formation of a rare earth silicate-based hermetic layer adjacent to the bondcoat layer and at least one rare earth silicate-based non-hermetic layer thereon.

Further aspects of the present disclosure are provided by the subject matter of the following clauses:

A coated component, comprising: a substrate having a surface; and a bondcoat over the surface of the substrate, wherein the bondcoat comprises a plurality of core-shell particulates and a plurality of oxide-sintering aid globular phases dispersed within a metalloid-based material matrix, wherein the plurality of core-shell particulates have a shell comprising a metalloid oxide around a core comprising a metalloid-based material, and wherein the plurality of oxide-sintering aid globular phases includes a mixture of the metalloid oxide and a sintering aid.

The coated component of any preceding clause, wherein the metalloid oxide comprises silicon oxide, and wherein the metalloid-based material comprises silicon and silicon oxide.

The coated component of any preceding clause, wherein the bondcoat has a degree of oxidation that is 5% by volume to 40% by volume.

The coated component of any preceding clause, wherein the oxide-sintering aid globular phases comprise a sintering aid, wherein the sintering aid is present in an amount of 0.03% by weight to 1.0% by weight of the bondcoat.

The coated component of any preceding clause, wherein the oxide-sintering aid phase comprises a sintering aid selected from the group consisting of Al, B, Ca, Cu, Fe, Hf, Mg, Mn, N, Ni, P, O, Ti, V, Zr, Au, Cr, Sn, In, Bi, Ga, La, Ce, Sb, As, Hf, a mullite-based material, and a combination thereof.

The coated component of any preceding clause, wherein at least two sintering aids are present in the oxide-sintering aid globular phases, wherein the at least two sintering aids comprise a combination of Fe and Al, a combination of Fe and Ni, a combination of Fe and Ca, or a combination of Fe, Al, Ca, Ni, Zr, and Cu.

The coated component of any preceding clause, wherein at least two sintering aids are present in the oxide-sintering aid globular phases, and wherein each sintering aid is present, independently, in an amount of 0.001% by weight to less than 0.999% by weight.

The coated component of any preceding clause, wherein the plurality of core-shell particulates has an average sphericity of 1.0 to 1.8.

The coated component of any preceding clause, wherein the plurality of core-shell particulates has an average diameter that is 3 μm or less.

The coated component of any preceding clause, wherein the bondcoat comprises defects defining 15% by volume or less.

The coated component of any preceding clause, wherein the defects have an average diameter that is less than 1 μm.

The coated component of any preceding clause, wherein the defects are pores in the bondcoat.

The coated component of any preceding clause, wherein the bondcoat has a thickness of 25 μm to 150 μm.

The coated component of any preceding clause, wherein the metalloid-based material matrix comprises substantially pure silicon.

The coated component of any preceding clause, wherein the metalloid-based material matrix defines a continuous phase.

The coated component of any preceding clause, wherein the bondcoat is formed from a high velocity air and fuel deposition process such that the bondcoat is substantially free from a glassy phase therein.

The coated component of any preceding clause, wherein the substrate comprises silicon-based substrate.

The coated component of any preceding clause, wherein the substrate comprises a ceramic matrix composite.

The coated component of any preceding clause, wherein the ceramic matrix composite comprises silicon carbide.

The coated component of claim 1, further comprising: an environmental barrier coating over the bondcoat.

The coated component of any preceding clause, further comprising: a thermally grown oxide layer over the bondcoat, wherein the thermally grown oxide layer is positioned between the bondcoat and the environmental barrier coating.

The coated component of any preceding clause, wherein the thermally grown oxide layer has a thickness of 1 μm to 10 μm.

A method of forming the coated component of any preceding clause.

A method of forming a bondcoat on a surface of a substrate, the method comprising: depositing a bondcoat layer on the surface of the substrate, wherein the bondcoat includes a plurality of core-shell particulates and a plurality of oxide-sintering aid globular phases on the surface, wherein the plurality of core-shell particulates have a shell comprising a metalloid oxide around a core comprising a metalloid-based material, and wherein the plurality of oxide-sintering aid globular phases includes a mixture of the metalloid oxide and a sintering aid.

A method of forming a bondcoat on a surface of a substrate, the method comprising: depositing a plurality of core-shell particulates and a plurality of oxide-sintering aid globular phases on the surface to form the bondcoat, wherein the plurality of core-shell particulates have a shell comprising a metalloid oxide around a core comprising a metalloid-based material.

The method of any preceding clause, wherein the plurality of core-shell particulates and the plurality of oxide-sintering aid globular phases are dispersed within a metalloid-based material matrix.

The method of any preceding clause, wherein the bondcoat is formed from a high velocity air and fuel deposition process such that the bondcoat is substantially free from a glassy phase therein.

A coated component, comprising: a substrate having a surface; a bondcoat over the surface of the substrate, wherein the bondcoat comprises a plurality of core-shell particulates and a plurality of oxide-sintering aid globular phases dispersed within a metalloid-based material matrix, wherein the plurality of core-shell particulates having a shell comprising a metalloid oxide around a core comprising a metalloid-based material, and wherein the plurality of oxide-sintering aid globular phases includes a mixture of the metalloid oxide and a sintering aid; a thermally grown oxide layer over the bondcoat; and an environmental barrier coating over the thermally grown oxide layer.

This written description uses exemplary embodiments to disclose various examples, including the best mode, and also to enable any person skilled in the art to practice the disclosed embodiments, including making and using any devices or systems and performing any incorporated methods. The patentable scope of the disclosed embodiments is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A coated component, comprising:
a substrate having a surface; and
a bondcoat over the surface of the substrate, wherein the bondcoat comprises a plurality of core-shell particulates and a plurality of oxide-sintering aid globular phases dispersed within a metalloid-based material matrix, wherein the plurality of core-shell particulates have a shell comprising a metalloid oxide around a core comprising a metalloid-based material, and wherein the plurality of oxide-sintering aid globular phases includes a mixture of the metalloid oxide and a sintering aid.

2. The coated component of claim 1, wherein the metalloid oxide comprises silicon oxide, and wherein the metalloid-based material comprises silicon and silicon oxide.

3. The coated component of claim 2, wherein the bondcoat has a degree of oxidation that is 5% by volume to 40% by volume.

4. The coated component of claim 1, wherein the oxide-sintering aid globular phases comprise a sintering aid, wherein the sintering aid is present in an amount of 0.03% by weight to 1.0% by weight of the bondcoat.

5. The coated component of claim 1, wherein the oxide-sintering aid phase comprises a sintering aid selected from the group consisting of Al, B, Ca, Cu, Fe, Hf, Mg, Mn, N, Ni, P, O, Ti, V, Zr, Au, Cr, Sn, In, Bi, Ga, La, Ce, Sb, As, Hf, a mullite-based material, and a combination thereof.

6. The coated component of claim 5, wherein at least two sintering aids are present in the oxide-sintering aid globular phases, wherein the at least two sintering aids comprise a combination of Fe and Al, a combination of Fe and Ni, a combination of Fe and Ca, or a combination of Fe, Al, Ca, Ni, Zr, and Cu.

7. The coated component of claim 5, wherein at least two sintering aids are present in the oxide-sintering aid globular phases, and wherein each sintering aid is present, independently, in an amount of 0.001% by weight to less than 0.999% by weight.

8. The coated component of claim 1, wherein the plurality of core-shell particulates has an average sphericity of 1.0 to 1.8.

9. The coated component of claim 1, wherein the plurality of core-shell particulates has an average diameter that is 3 μm or less.

10. The coated component of claim 1, wherein the bondcoat comprises defects defining 15% by volume or less.

11. The coated component of claim 10, wherein the defects have an average diameter that is less than 1 μm.

12. The coated component of claim 1, wherein the bondcoat has a thickness of 25 μm to 150 μm.

13. The coated component of claim 1, wherein the metalloid-based material matrix comprises substantially pure silicon.

14. The coated component of claim 1, wherein the metalloid-based material matrix defines a continuous phase.

15. The coated component of claim 1, wherein the substrate comprises silicon-based substrate.

16. The coated component of claim 15, wherein the substrate comprises a ceramic matrix composite.

17. The coated component of claim 16, wherein the ceramic matrix composite comprises silicon carbide.

18. The coated component of claim 1, further comprising:
an environmental barrier coating over the bondcoat.

19. The coated component of claim 18, further comprising:
a thermally grown oxide layer over the bondcoat, wherein the thermally grown oxide layer is positioned between the bondcoat and the environmental barrier coating.

20. The coated component of claim 19, wherein the thermally grown oxide layer has a thickness of 1 μm to 10 μm.

* * * * *